INVENTOR.
CLAUDE M. GRINAGE
ATTORNEY

May 19, 1959

C. M. GRINAGE 2,887,268

PLURAL MACHINE CONTROL SYSTEM

Filed Aug. 31, 1955

IM-3M- MACHINE STARTER
CM- CONTROL MOTOR
CR1-CR3- COUNTER CONTROL
    RELAY
PCM1- PCM3- COUNTER MOTOR
C1- C3- COUNTER SWITCH
CM1- CM6- CONTROL DRUM
    SWITCH
CM7- CONTROL MOTOR
    HOLDING SWITCH
P1- P3- COUNTER ACTUATING
    SWITCH
PCMF- COUNTER MOTOR
    FORWARD SWITCH
PCMR- COUNTER MOTOR
    REVERSE SWITCH

INVENTOR.
CLAUDE M. GRINAGE

ATTORNEY

United States Patent Office 2,887,268
Patented May 19, 1959

2,887,268

PLURAL MACHINE CONTROL SYSTEM

Claude M. Grinage, Stratford, Conn., assignor to The Bullard Company, a corporation of Connecticut Application August 31, 1955, Serial No. 531,786

6 Claims. (Cl. 235—132)

The present invention relates to a control having particular application in those systems in which successive operations are to be performed on workpieces by successive machines, each of which possesses fixed, relatively fast production rates that vary relatively to each other, and wherein a predetermined inventory between machines must not be exceeded.

In such systems where the production rates per machine can be changed, or are slow enough to permit stopping of the machine after the forming of a working operation on a single workpiece, the solution to the problem is relatively simple, and may follow the well-known Mult-Au-Matic method (U.S. Patent 1,360,175) of machining which requires idle time at stations (machines) having short operating cycles compared with the station at which the longest cycle of operation is being performed, before the work is transferred to the next succeeding station (machine). However, where the successive machines are of the punch press type wherein the rapidity of strokes is such as to make it impractical to stop the machines between each stroke, the Mult-Au-Matic method is inapplicable.

The principal object of this invention is to provide a system of operating a plurality of machines having relatively fast production rates that vary relatively to each other such that there is a continuous flow of inventory through the machines without excessive inventory build-up between them.

Other objects include the provision of a control for each of a plurality of machines having relatively fast but different production rates, which controls are governed by a master control for integrating the production of the various machines so that no excessive build of inventory occurs between the machines; and the provision of such a system wherein each of the plurality of machines is rendered inactive after the completion of a cycle of its operation in accordance with an optimum pre-set rate of production.

The above, as well as other objects and novel features of the new and improved control system will become apparent from the following specification and accompanying drawings, in which.

Figures 1, 1A:
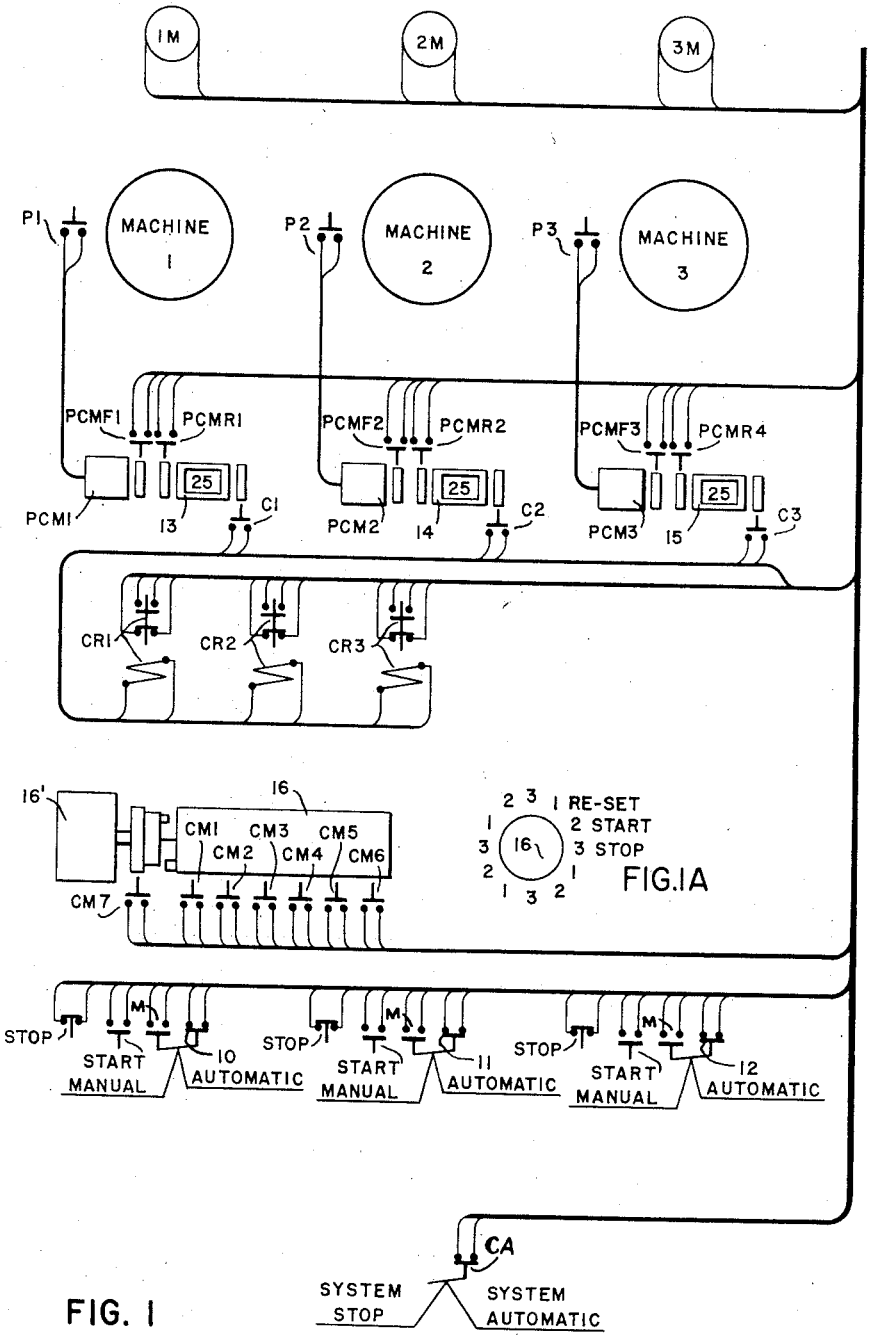
Figure 1 is a schematic diagram of component parts to which the principles of the invention have been applied.
Fig. 1A is an end view of the drum of Fig. 1.

Referring to the drawings, and particularly Fig. 1, machine #1 is adapted to produce, say, 1200 parts per hour, or 20 per minute or 1 every 3 seconds; machine #2 is adapted to produce 300 parts per hour, or 5 per minute or 12 seconds for each part; and, machine #3 is adapted to produce 600 parts per hour, or 10 per minute or 1 every 6 seconds. It is obvious that it would be impractical to stop any of these machines between successive operations on parts; however, it is assumed for the purposes of this description that the tolerable inventory between the machines is in the neighborhood of 25 parts, and that economical operation of the various machines would permit them to be stopped upon completion of the 25 parts. A manual-automatic switch may include contacts 10 and contacts M mounted on a pivoted link so that when one is closed, the other is open. With the switch 10 open in the manual position and switch M closed, 26 parts are manually operated upon by machine #1 by employing the start switch (1). One of these parts is located between machine #1 and machine #2. The remaining 25 parts are manually operated upon by machine #2 with switch 11 open in the manual position and switch M' closed, by employing the start switch (5). The 25 parts operated on by machines #1 and #2 are then located between machines #2 and #3. With the switches CA, 10, 11 and 12 (1, 3, 7, 11) in the position shown in the drawing, namely, in the automatic position with switches 10, 11 and 12 closed, and switch M, M' and M" open, the apparatus is in condition to begin a series of automatic cycles of operations. The CA switch is merely a manually operable switch for stopping the system in an emergency. Counting devices 13, 14 and 15 are provided for each of the machines #1, #2 and #3. These counting devices are commercial items and have the characteristic of being adapted to be pre-set to any numerical value and upon that numerical value reaching zero, they are adapted automatically to be stopped. Inasmuch as the operation of the counter mechanisms 13, 14 and 15 for the various machines is identical, only the mechanism 13 of machine #1 will be described. As shown in the drawing, it is set at the numeral 25, and each time a piece of work is operated upon by the machine #1, the switch P1 adjacent machine #1 is closed. This switch P1 is found in the wiring diagram of Fig. 2 in line 19 thereof. Future reference to the wiring diagram of Fig. 2 will include numerals within parentheses which numerals refer to lines in the diagram to assist in following the wiring diagram with facility.

Figure 2:
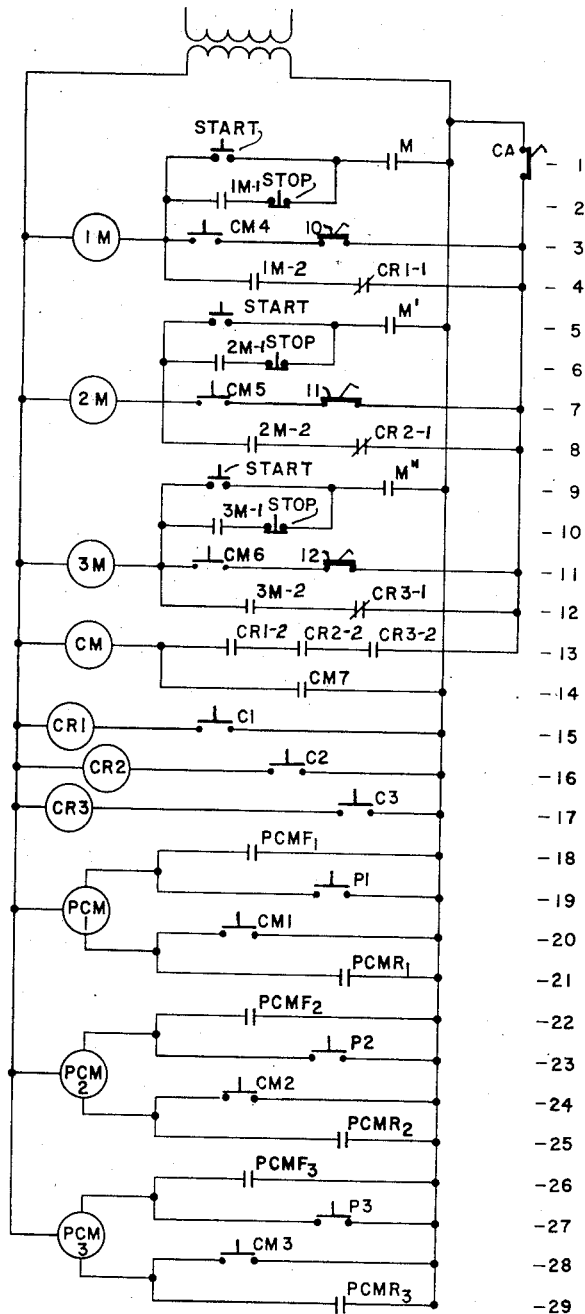
Fig. 2 is a diagram of the electrical circuit for the component parts shown in Fig. 1.

The diagram of Fig. 2 is the conventional "accross-the-line" wiring diagram in which the circles represent coils of relays, the energization of which causes energization of various components controlled by them including the closing of normally-open switches and the opening of normally-closed switches. Normally-open switches controlled by relays are shown as two parallel lines, while normally-closed switches are shown as two parallel lines with a diagonal line passing across them. Thus, with switch 10 closed in the automatic setting of the apparatus, closing of switch CM4 will energize relay coil 1M (3) which starts the rotation of machine #1. Energization of relay coil 1M (3) also effects closing of the 1M–1 and 1M–2 switches (2, 4), the latter of which holds the relay coil 1M (3) energized through the normally-closed CR1–1 switch (4) when the CM4 switch (3) opens as drum 16 indexes to its next position.

In order to produce successive cycles of operation of the machines #1, #2 and #3, a control drum 16 is provided and includes three index positions, the first identified as "Re-Set," the second as "Start," and the third as "Stop." For convenience, these stations are repeated around the periphery of the drum 16. At the station Re-Set there are dogs adapted to close CM1, CM2 and CM3 switches (20, 24, 28). At the index station Start on the drum 16, dogs are arranged to close switches CM4, CM5 and CM6 (3, 7, 11). At the start of a cycle of operations, a motor 16' is energized and acts through a Geneva stop mechanism or the like to index drum 16 from the Stop position to the Re-Set, to the Start position and thence to the Stop position where it will remain until the completion of the cycle of operation including the performing of work on 25 parts at which time it is again caused to index to the Re-Set, the Start and thence to the Stop positions without any substantial delay of time at any index position except the Stop position where it remains until the cycle has been completed. Assume that the drum 16 has just moved from the Start position to the Stop position and is waiting there until the completion of the cycle, switches CM4, CM5 and CM6 (3, 7, 11) have been closed. Since the switches 10, 11 and 12 (3, 7, 11) have been closed manually in placing the apparatus in condition for automatic operation, the motor relays 1M, 2M and 3M (3, 7, 11) are energized, thereby causing the machines #1, #2 and #3 to operate. Energization of the motor relays 1M, 2M and 3M effects the closing of the normally open switches 1M-2, 2M-2 and 3M-2 (4, 8, 12) thereby holding the energization of the motor relays 1M, 2M and 3M after the drum 16 indexes from its Start position to its Stop position at which time the CM4, CM5 and CM6 switches (3, 7, 11) open. Energization of relays 1M, 2M and 3M also closes contacts 1M-1, 2M-1 and 3M-1 (2, 6 and 10), but these are for holding circuits for manual operation. As each part is completed on machine #1, it effects the closing of the P1 switch (19) thereby energizing the PCM1 motor relay in a forward direction which causes the closing of PCMF1 switch to hold the circuit until an index of the counter 13 is completed. This index causes the numeral 25 to reduce to 24 in the counter, and each succeeding piece that is operated on by machine #1 causes a reduction in the number of the counter until zero is reached. At the time the zero mark in the counter 13 is reached, the switch C1 (15) is mechanically closed by a cam on the counter shaft which effects the energization of the CR1 relay (15) thereby closing the CR1-2 switch (13) and opening the CR1-1 switch (4). Closing the CR1-2 switch (13) does not energize the CM relay (13) because the CR2-2 and CR3-2 switches are still open. However, opening of the CR1-1 switch (4) de-energizes the motor relay 1M thereby causing the machine #1 to come to rest.

In the same manner, when the counter 15 of machine #3 reaches zero, it being the second fastest machine of the three, the switch C3 (17) is mechanically closed by a cam on the shaft of the counter 15 thereby energizing the CR3 relay (17) and causing the closing of the CR3-2 switch (13) as well as opening of the CR3-1 switch (12). Opening of the CR3-1 switch (12) de-energizes the 3M motor relay (11) thereby causing machine #3 to come to rest.

Finally, when the counter 14 arrives at zero, C2 switch (16) is closed energizing the CR2 relay (16) thereby opening the CR2-1 switch (8) which causes machine #2 to come to rest. Also, energization of the CR2 relay (16) closes the CR2-2 switch (13) whereupon the CM relay (13) is energized which effects the indexing of the drum 16 by the motor 16' by a conventional Geneva stop connection or the like. This motor causes the indexing of the control drum 16 from the station Stop to station #1, which is Re-set, whereupon switches CM1, CM2 and CM3 (20, 24 and 28) are again closed. Closing of the CM1, CM2 and CM3 switches energizes the PCM1, PCM2 and PCM3 motor relays in a reverse direction to thereby re-set the counters. Energization of these relays causes closing of their respective PCMR1, PCMR2 and PCMR3 switches (21, 25 and 29) to hold their corresponding relay coils energized until the re-setting of the counters 13, 14 and 15 has been accomplished. The counters 13, 14 and 15 are re-set to the predetermined value of 25, and to effect opening of the C1, C2 and C3 switches (15, 16, 17), after which time the motor relays PCM1, PCM2 and PCM3 are de-energized. Immediately, the control drum 16 indexes to station #2, or the Start position, thereby reclosing the switches CM4, CM5 and CM6 (3, 7, 11) whereupon the motor relays 1M, 2M and 3M (3, 7, 11) are re-energized thereby to restart machines #1, #2 and #3 to repeat the cycle.

From the foregoing, it is evident that machine #1 operates for 1¼ minutes in producing 25 parts, and remains idle for the next 3¾ minutes making up the 5 minutes required for the operation of the machine #2. Likewise, machine #3 operates on the parts that are between it and machine #2 for 2½ minutes, and then it is idle for 2½ minutes while the machine #2 completes its 5-minute operation in producing its 25 parts. At the beginning of each cycle, there will always be one part between machines #1 and #2 and 25 parts between machines #2 and #3, so that at no time will the fast machine #1 build up more than 25 parts between it and machine #2, and at all times machine #3 will have adequate parts upon which to work which are supplied from the slower machine #2.

Although the various features of the new and improved system have been shown and described in detail to fully disclose one embodiment of the invention, it will be evident that numerous changes may be made in such details, and certain features may be used without others, without departing from the principles of the invention.

What is claimed is:

1. Apparatus comprising in combination, a plurality of machines, each having a fixed, relatively fast but different production rate; a counting device for each machine; means for causing said counting device to operate each time its corresponding machine has completed a working operation; means for stopping each machine when its corresponding counting device has been operated a predetermined number of times; means for simultaneously starting all of said machines; means for re-setting all of said counters to the same predetermined number; and means responsive to the stopping of the machine having the longest production rate for rendering effective said re-setting means.

2. Apparatus comprising in combination, a plurality of machines, each having a fixed, relatively fast but different production rate; a control drum adapted to be indexed from station to station, one of said stations being adapted simultaneously to start all machines; means independent of said function drum for stopping each machine when it has performed a predetermined plurality of productions; and means responsive to the stopping of the machine having the longest production rate for causing said control drum to be indexed to effect simultaneous starting of all of said machines.

3. Apparatus comprising in combination, a plurality of machines, each having a fixed, relatively fast but different production rate; means for simultaneously starting all of said machines; means for stopping each machine when it has performed a plurality of productions; a control drum adapted to be indexed from station to station; and means responsive to the stopping of the machine having the longest production rate for rendering effective the indexing of said function drum, whereby it is indexed to a station effective to start all of said machines, thence to a station where it remains until re-energized by the stopping of the machine having the longest production rate.

4. Apparatus comprising in combination, a plurality of machines, each having a fixed, relatively fast but different production rate; a counting device for each machine; means for energizing a motor for causing said counting device to operate each time its corresponding machine has completed a working operation; cam means associated with said counting device for causing stopping of the corresponding machine when said counting device has operated a predetermined number of times; means for simultaneously starting all of said machines; means for re-setting all of said counting devices to the same predetermined number; and means responsive to the stopping of the machine having the longest production rate for rendering effective said re-setting means.

5. Apparatus comprising in combination, a plurality of machines, each having a fixed, relatively fast but different production rate; a counting device for each machine; means for causing said counting device to operate each time its corresponding machine has completed a working operation; cam means associated with said counting device for stopping the corresponding machine when the corresponding counting device has operated a predetermined number of times; means for re-setting all of said counting devices to the same predetermined number; a control drum adapted to be indexed from station to station to cause all of said machines to be started simultaneously and to initiate said re-setting means; and means responsive to the stopping of the machine having the longest production rate for rendering effective the indexing of said control drum.

6. Apparatus comprising in combination, a plurality of machines, each having a fixed, relatively fast but different production rate; a counting device for each machine; means for causing said counting device to operate each time its corresponding machine has completed a working operation; cam means for stopping each machine when its corresponding counting device has operated a predetermined number of times; means for re-setting all of said counting devices to the same predetermined number; a control drum adapted to be indexed from station to station to cause said re-setting mechanism to be rendered effective, thence to effect the simultaneous starting of all machines; and means responsive to the stopping of the machine having the longest production rate for rendering effective the indexing of said control drum.

References Cited in the file of this patent

UNITED STATES PATENTS 2,652,197     Berger _____ Sept. 15, 1953